United States Patent
Namigata et al.

(10) Patent No.: US 8,201,709 B1
(45) Date of Patent: Jun. 19, 2012

(54) FOOD DISPENSING ASSEMBLY AND METHOD

(76) Inventors: Hiroshi Namigata, Gardena, CA (US); Yasunori Fujiwara, Tokyo (JP)

( * ) Notice: Subject to any disclaimer, the term of this patent is extended or adjusted under 35 U.S.C. 154(b) by 850 days.

(21) Appl. No.: 12/252,019

(22) Filed: Oct. 15, 2008

(51) Int. Cl.
*B65D 30/10* (2006.01)

(52) U.S. Cl. ............ 222/105; 222/92; 222/95; 222/107; 222/460; 222/475; 222/566; 383/906; 248/95

(58) Field of Classification Search ............... 222/92, 222/93, 95, 103, 105, 107, 460, 465.1, 475, 222/566, 567, 461; 383/906; 248/95, 99; 141/114, 337, 338
See application file for complete search history.

(56) References Cited

U.S. PATENT DOCUMENTS

| | | | |
|---|---|---|---|
| 1,294,011 A | 2/1919 | Williams | |
| 1,817,732 A | 8/1931 | Boruss | |
| 2,600,631 A * | 6/1952 | Freedman | 222/103 |
| 2,776,077 A * | 1/1957 | Freedman | 222/103 |
| D221,214 S | 7/1971 | MacManus | |
| 4,205,765 A | 6/1980 | May | |
| 4,888,188 A | 12/1989 | Castner, Sr. et al. | |
| 5,373,968 A * | 12/1994 | Nelson | 222/99 |
| 5,538,050 A * | 7/1996 | Galdon | 141/10 |
| 6,179,165 B1 | 1/2001 | Knight et al. | |
| 7,802,763 B2 * | 9/2010 | Faller et al. | 248/95 |
| 2003/0091702 A1* | 5/2003 | Folkmar | 426/115 |
| 2004/0124210 A1 | 7/2004 | Bartlein | |
| 2005/0092770 A1* | 5/2005 | Yechouron | 222/105 |
| 2005/0178804 A1 | 8/2005 | Renfrew et al. | |
| 2005/0263613 A1* | 12/2005 | Beck et al. | 239/304 |

* cited by examiner

*Primary Examiner* — J. Casimer Jacyna

(57) ABSTRACT

A food dispensing assembly includes a front wall attached to a rear wall. The container includes a top edge, a bottom edge and a pair of lateral edges. The lateral edges taper toward the bottom edge and the bottom edge is pointed. A food product is positioned in the container. A gripping sleeve has a frusto-conical shape and includes an open upper edge and an open lower edge. The container extends through the sleeve and the sleeve is positioned between the top and bottom edges. The container is cut along a plane of the lower edge to remove the bottom edge and open the container.

9 Claims, 6 Drawing Sheets

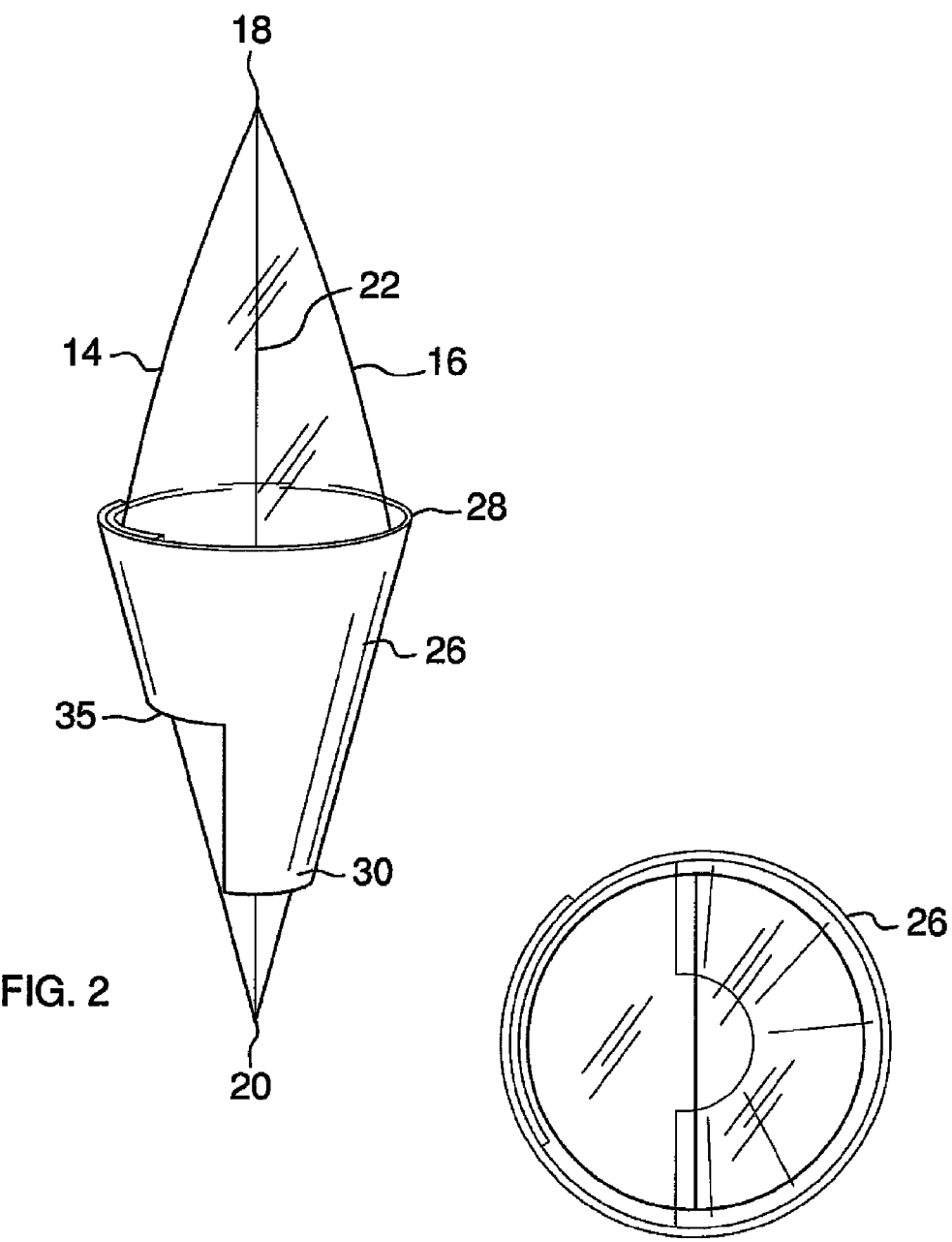

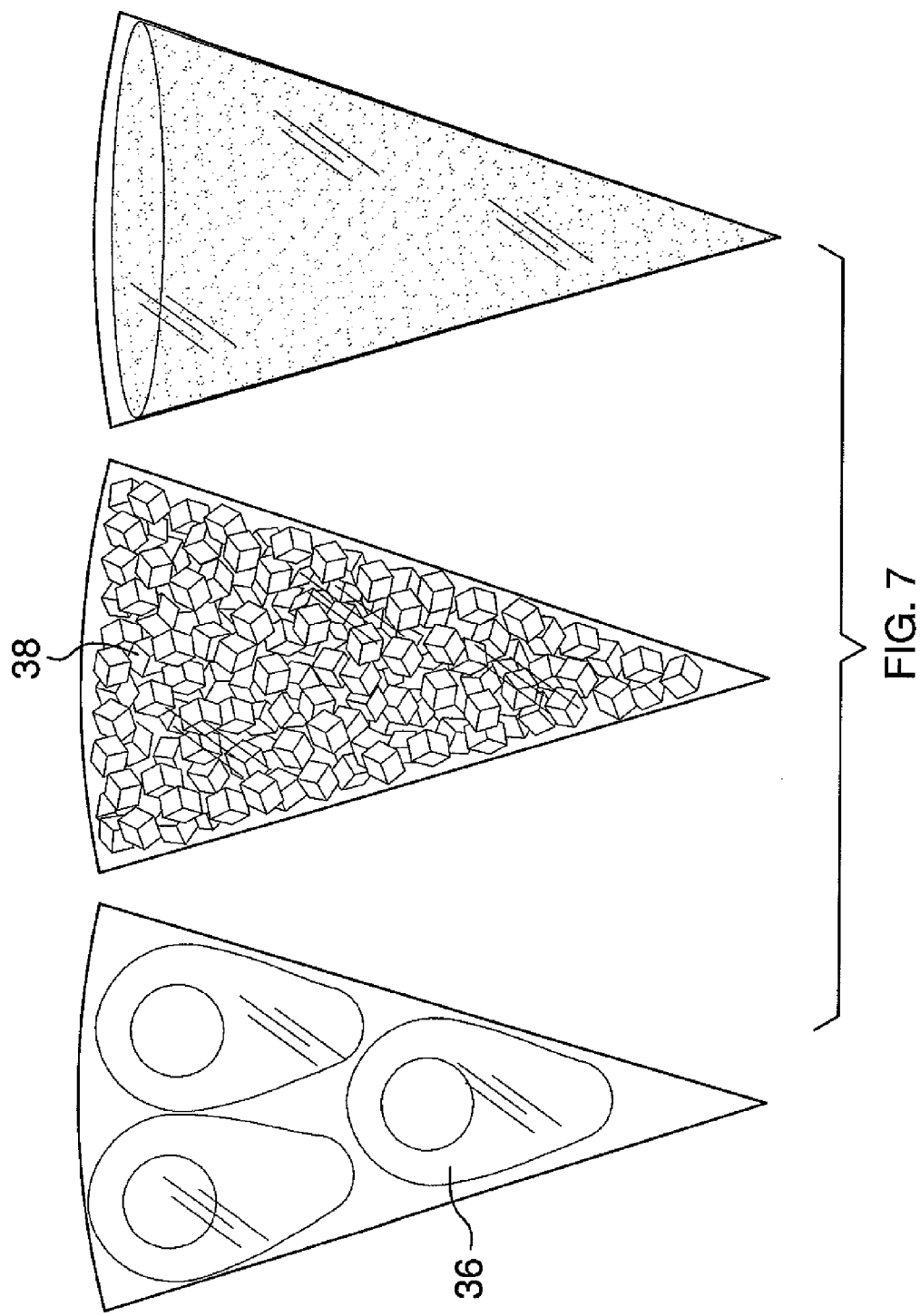

FOOD DISPENSING ASSEMBLY AND METHOD

BACKGROUND OF THE INVENTION

Field of the Invention

The present invention relates to food dispensing devices and more particularly pertains to a new food dispensing device for holding and dispensing avocado paste.

SUMMARY OF THE INVENTION

The present invention meets the needs presented above by generally comprising a flexible container that includes a front wall attached to a rear wall. The container includes a top edge, a bottom edge and a pair of lateral edges. The lateral edges taper toward the bottom edge and the bottom edge is pointed. A food product is positioned in the container. A gripping sleeve has a frusto-conical shape and includes an open upper edge and an open lower edge. The container extends through the sleeve and the sleeve is positioned between the top and bottom edges. The container is cut along a plane of the lower edge to remove the bottom edge and open the container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side perspective view of the present invention.

FIG. 3 is a top view of the present invention.

FIG. 7 is a front view of additional embodiments the present invention.

DESCRIPTION OF THE PREFERRED EMBODIMENT

Figure 1:
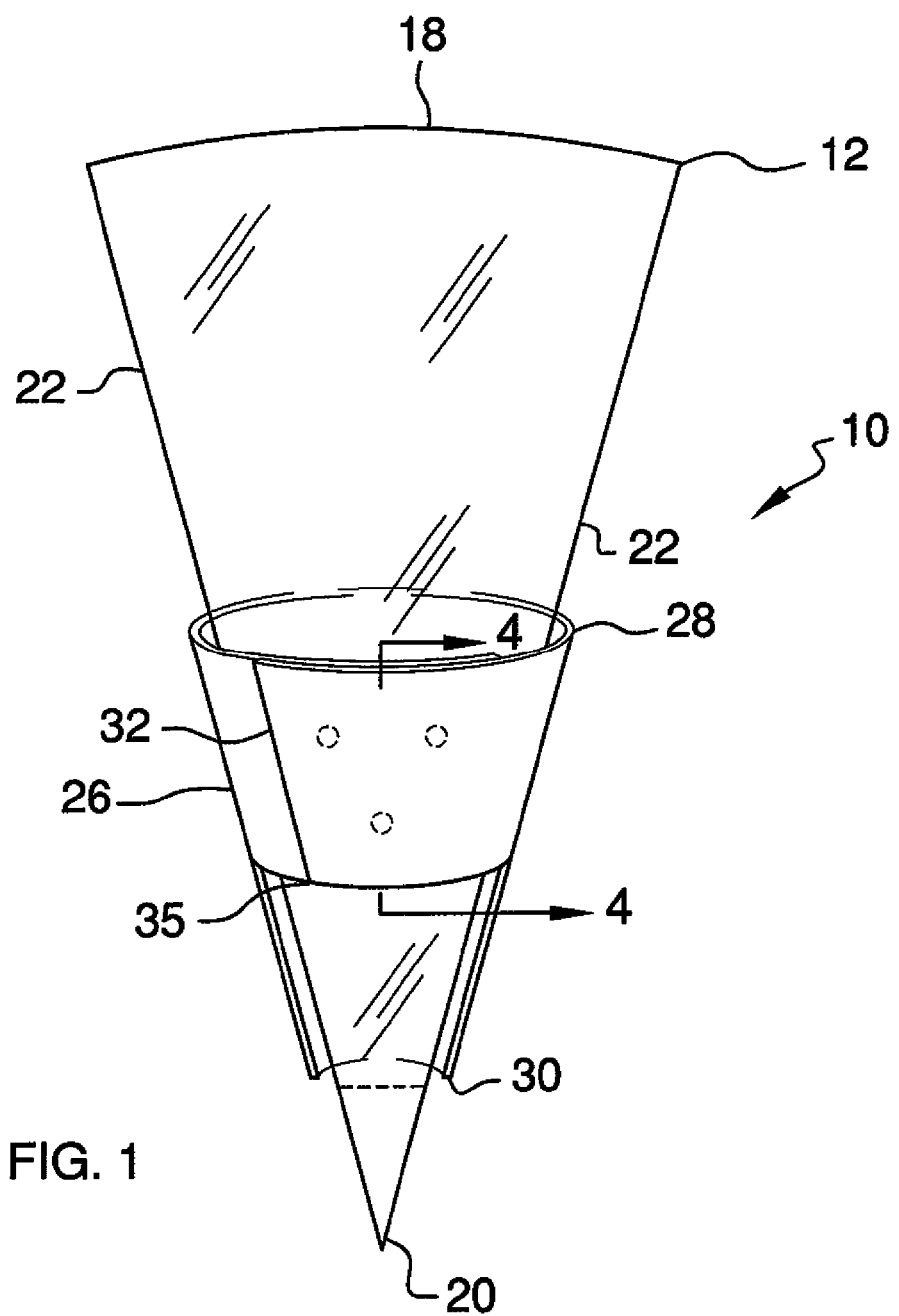
FIG. 1 is a front perspective of a food dispensing assembly and method according to the present invention.
Figure 4:
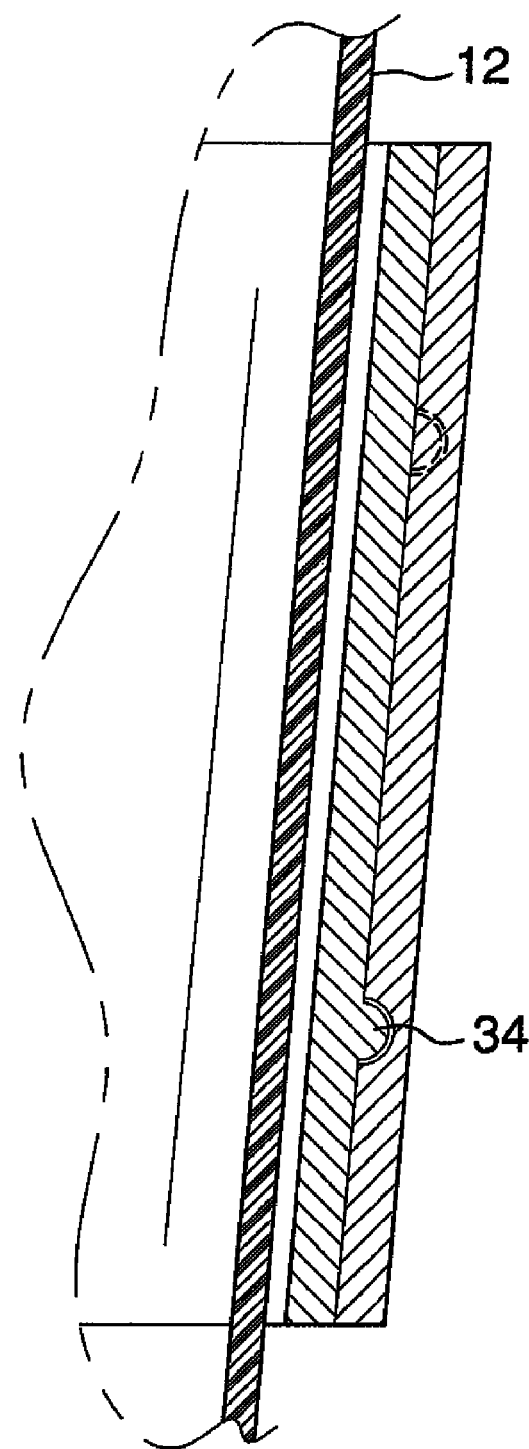
FIG. 4 is a cross-sectional view taken along line 4-4 of FIG. 1 of the present invention.

With reference now to the drawings, and in particular to FIGS. 1 through 7 thereof, a new food dispensing device embodying the principles and concepts of the present invention and generally designated by the reference numeral 10 will be described.

As best illustrated in FIGS. 1 through 7, the food dispensing assembly and method 10 generally comprises a flexible container 12 that includes a front wall 14 attached to a rear wall 16 and the front 14 and rear 16 walls are sealed along their joined perimeter edges. The flexible container 12 is comprised of a transparent plastic material. The container 12 includes a top edge 18, a bottom edge 20 and a pair of lateral edges 22. The lateral edges 22 taper toward the bottom edge 20 and the bottom edge 20 is pointed. The top edge 18 is arcuate. A food product 24 is positioned in the container 12. The food product 24 comprises avocado paste. The food product may consist of only avocado paste, or it may consist of avocado paste and a preservative to prevent discoloration of the avocado paste. More particularly, the food product 24 may consist of avocado paste and vitamin C which acts a preservative.

A gripping sleeve 26 has a frusta-conical shape and includes an open upper edge 28 and an open lower edge 30. The container 12 extends through the sleeve 26 and the sleeve 26 is positioned between the top 18 and bottom 20 edges. The sleeve 26 has a break 32 therein extending through the upper 28 and lower 30 edges. The sleeve 26 is overlapped upon itself to tighten the sleeve 26 on the container 12. A coupler 34 retains the sleeve 26 in a tightened condition. The coupler 34 includes male and female engaging members. The sleeve 26 has a notch 35 therein extending upwardly into the lower edge 30.

Figure 5:
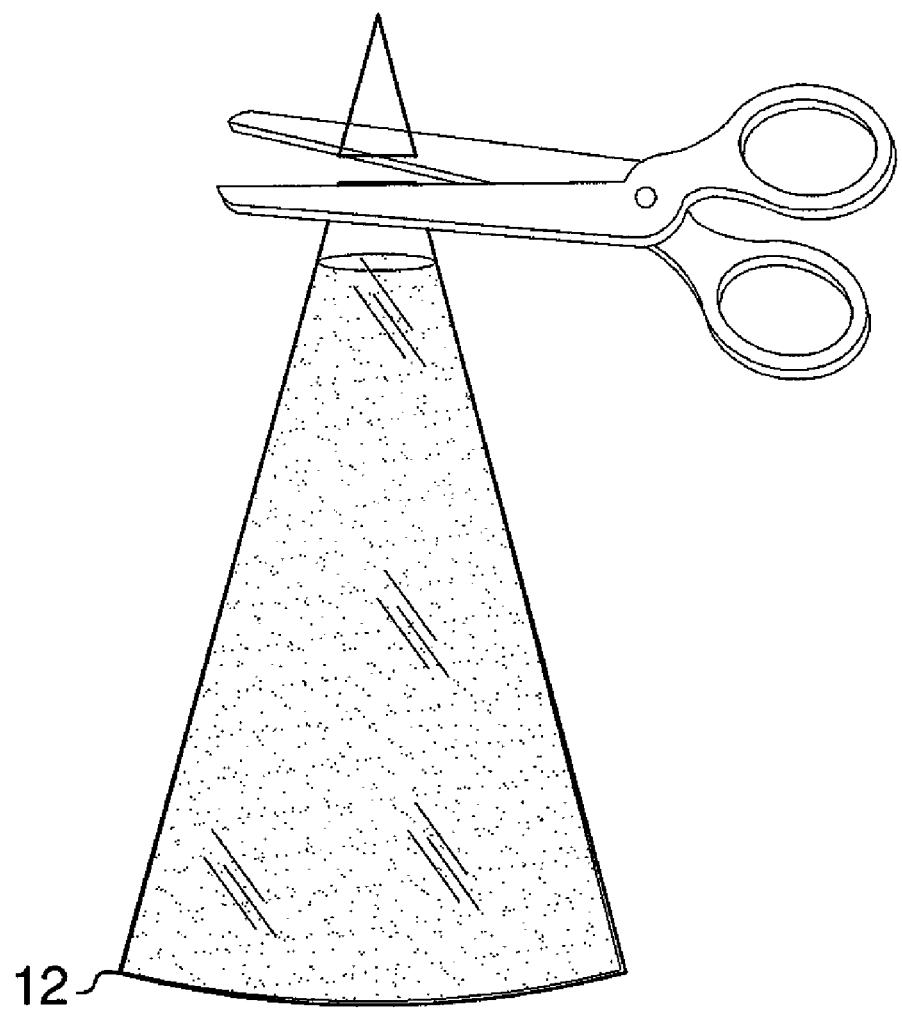
FIG. 5 is an in-use view of the present invention.
Figure 6:
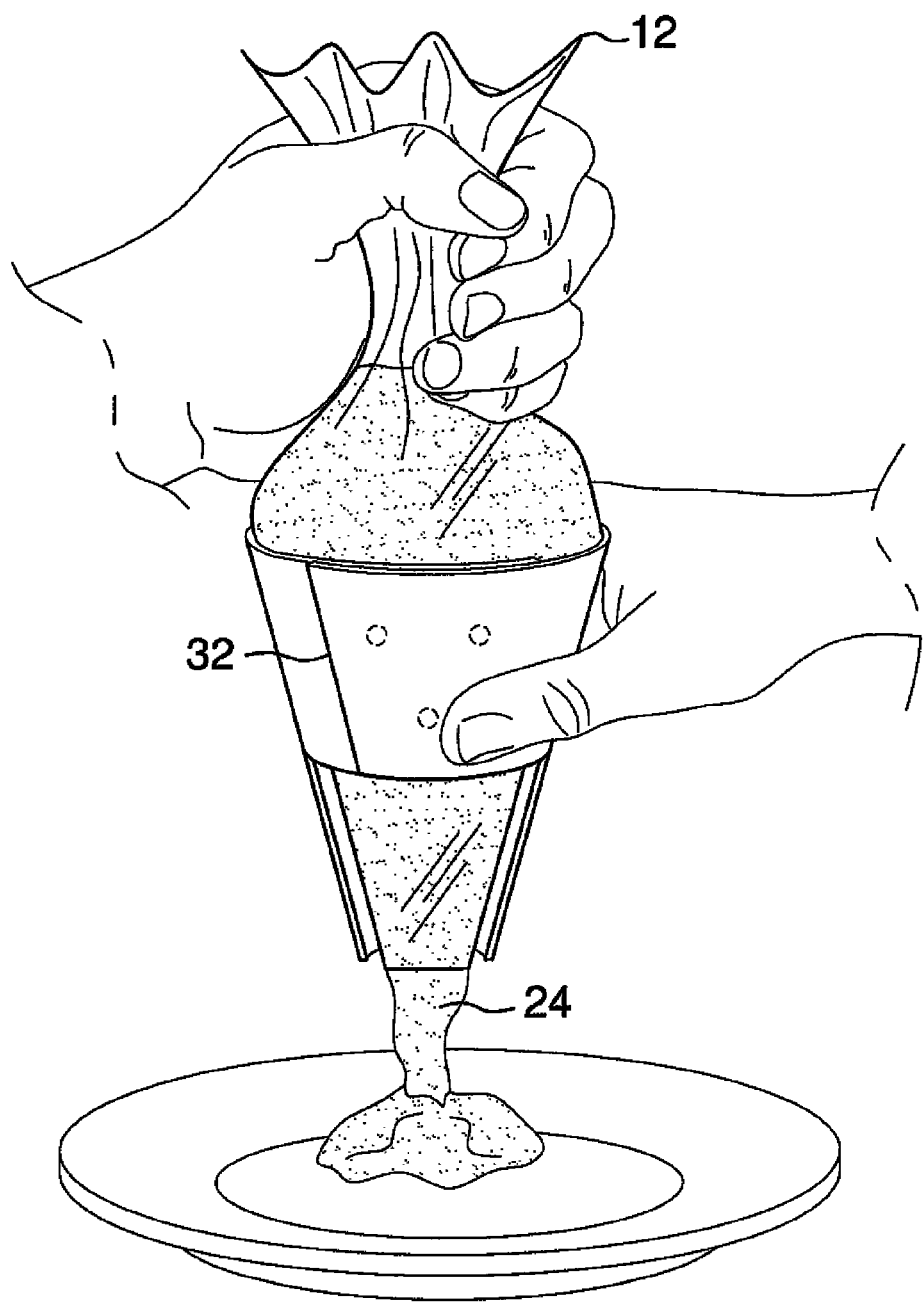
FIG. 6 is an in-use view of the present invention.

In use, the container 12 is cut along a plane of the lower edge 30 to remove the bottom edge 20 and open the container 12. The container 12 is then squeezed, along or adjacent to its top edge 12, to force the avocado 24 out of the container. The container 12, until it is cut, is airtight and prevents the rapid spoilage of the avocado 24 while providing users of the assembly 10 an easy means of accessing avocado paste 24 for a plurality of uses. As can be seen in FIG. 7, the container 12 may also hold halves 36 of avocado or cubes 38 of avocado. As is shown in FIG. 5, the container 12 may be used without the sleeve 26. However, the sleeve 26 provides structure for gripping while using the assembly 10 while the notch 35 still provides for easy viewing of the contents of the container 12. The sleeve 26 also prevents heat transfer between the user's hand and the container 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A food dispensing assembly comprising:

a flexible container including a front wall attached to a rear wall, said container including a top edge, a bottom edge and a pair of lateral edges, said lateral edges tapering toward said bottom edge and said bottom edge being pointed, a food product being positioned in said container;

a gripping sleeve having a frusto-conical shape and including an open upper edge and an open lower edge, said container extending through said sleeve and said sleeve being positioned between said top and bottom edges, wherein said sleeve has a break therein extending through said upper and lower edges, said sleeve being overlapped upon itself to tighten said sleeve on said container and such that an outer surface of said sleeve is partially covered by an inner surface of said sleeve where said sleeve overlaps upon itself; and wherein the container is cut along a plane of the lower edge to remove the bottom edge and open said container.

2. The assembly according to claim 1, wherein said food product consists of avocado paste and a preservative.

3. The assembly according to claim 1, further including a coupler retaining said sleeve in a tightened condition.

4. The assembly according to claim 3, wherein said coupler includes male and female engaging members.

5. The assembly according to claim 1, said sleeve having a notch therein extending upwardly into said lower edge.

6. A food dispensing assembly comprising:

a flexible container including a front wall attached to a rear wall, said container including a top edge, a bottom edge and a pair of lateral edges, said lateral edges tapering toward said bottom edge and said bottom edge being pointed, said top edge being arcuate, a food product being positioned in said container, said food product comprising avocado paste;

a gripping sleeve having a frusto-conical shape and including an open upper edge and an open lower edge, said container extending through said sleeve and said sleeve being positioned between said top and bottom edges, said sleeve having a break therein extending through said upper and lower edges, said sleeve being overlapped upon itself to tighten said sleeve on said container, a coupler retaining said sleeve in a tightened condition, said coupler including male and female engaging members, said sleeve having a notch therein extending upwardly into said lower edge; and wherein the container is cut along a plane of the lower edge to remove the bottom edge and open said container.

7. A method of dispensing food, said method comprising the steps of:

providing a flexible container including a front wall attached to a rear wall, said container including a top edge, a bottom edge and a pair of lateral edges, said lateral edges tapering toward said bottom edge and said bottom edge being pointed, said top edge being arcuate;

positioning a food product being positioned in said container, said food product comprising avocado paste;

providing a gripping sleeve having a frusto-conical shape and including an open upper edge and an open lower edge, said sleeve having a break therein extending through said upper and lower edges;

overlapping said sleeve upon itself to tighten said sleeve on said container such that an outer surface of said sleeve is partially covered by an inner surface of said sleeve where said sleeve overlaps upon itself;

positioning said container through said sleeve and said sleeve being positioned between said top and bottom edges, said sleeve having a break therein extending through said upper and lower edges, said sleeve being overlapped upon itself to tighten said sleeve on said container, a coupler retaining said sleeve in a tightened condition;

cutting said container along a plane of the lower edge to remove the bottom edge and open said container; and squeezing said container to force the food product outwardly of said container.

8. A food dispensing assembly comprising:

a flexible container including a front wall attached to a rear wall, said container including a top edge, a bottom edge and a pair of lateral edges, said lateral edges tapering toward said bottom edge and said bottom edge being pointed, a food product being positioned in said container;

a gripping sleeve having a frusto-conical shape and including an open upper edge and an open lower edge, said container extending through said sleeve and said sleeve being positioned between said top and bottom edges; and wherein the container is cut along a plane of the lower edge to remove the bottom edge and open said container;

said sleeve having a break therein extending through said upper and lower edges, said sleeve being overlapped upon itself to tighten said sleeve on said container; and a coupler retaining said sleeve in a tightened condition; said coupler including male and female engaging members.

9. The assembly according to claim 8, said sleeve having a notch therein extending upwardly into said lower edge.

* * * * *